US012712471B2

(12) United States Patent
Masood et al.

(10) Patent No.: US 12,712,471 B2
(45) Date of Patent: Aug. 18, 2026

(54) SYSTEM AND METHOD FOR COMMON MODE VOLTAGE REDUCTION FOR SINGLE PHASE 3 WIRE MOTOR

(71) Applicant: Franklin Electric Co., Inc., Fort Wayne, IN (US)

(72) Inventors: Amjad Masood, Fort Wayne, IN (US); Benjamin Hunley, Fort Wayne, IN (US)

(73) Assignee: Franklin Electric Co., Inc., Fort Wayne, IN (US)

( * ) Notice: Subject to any disclaimer, the term of this patent is extended or adjusted under 35 U.S.C. 154(b) by 241 days.

(21) Appl. No.: 18/629,788

(22) Filed: Apr. 8, 2024

(65) Prior Publication Data

US 2025/0317074 A1 Oct. 9, 2025

(51) Int. Cl.
*H02M 7/5395* (2006.01)
*H02M 1/12* (2006.01)
*H02M 7/5387* (2007.01)

(52) U.S. Cl.
CPC ......... *H02M 7/5395* (2013.01); *H02M 1/123* (2021.05); *H02M 7/5387* (2013.01)

(58) Field of Classification Search
CPC .... H02M 1/123; H02M 1/12; H02M 7/53871; H02M 7/5395; H02M 7/784; H02M 7/5387; H02M 7/537
See application file for complete search history.

(56) References Cited

U.S. PATENT DOCUMENTS 7,825,621 B2 * 11/2010 Wei ........................ H02P 29/68 318/822
9,236,828 B1 * 1/2016 Wei ........................ H02P 27/08
10,158,299 B1 * 12/2018 Wei ........................ H02M 1/12
10,784,797 B1 * 9/2020 Sedano .................. H02M 1/08
2012/0075892 A1 * 3/2012 Tallam ................ H02M 5/4585 363/79
2012/0140532 A1 * 6/2012 Tallam ............. H02M 7/53875 363/37
2016/0329832 A1 * 11/2016 Aeloiza .................. H02M 1/12
2020/0136524 A1 * 4/2020 Chen .................. H02M 7/4807
2024/0235206 A1 * 7/2024 Preindl ................ H02M 3/158

* cited by examiner

*Primary Examiner* — Gustavo A Rosario-Benitez
(74) *Attorney, Agent, or Firm* — Faegre Drinker Biddle & Reath LLP

(57) ABSTRACT

A method and system are disclosed for reducing common mode voltage in a system that includes a controller and an inverter connected to a single phase 3 wire motor, comprising: controlling switches of the inverter to generate three voltage signals provided to the motor that emulate a three-phase sinusoidal waveform using a SPWM configuration; phase shifting the signals using a duty cycle overlap width; identifying sectors of the sinusoidal waveform based upon duty cycles of the signals; determining, at points for each sector, whether an identified Mid duty cycle is adjacent to an identified Max duty cycle; increasing, for each point, any Mid duty cycle that is adjacent by the duty cycle overlap width; and modifying the SPWM configuration to reduce instances where a first set of switches coupled to a positive voltage or a second set of switches coupled to a negative voltage are simultaneously ON or OFF.

20 Claims, 12 Drawing Sheets

Figure 8:
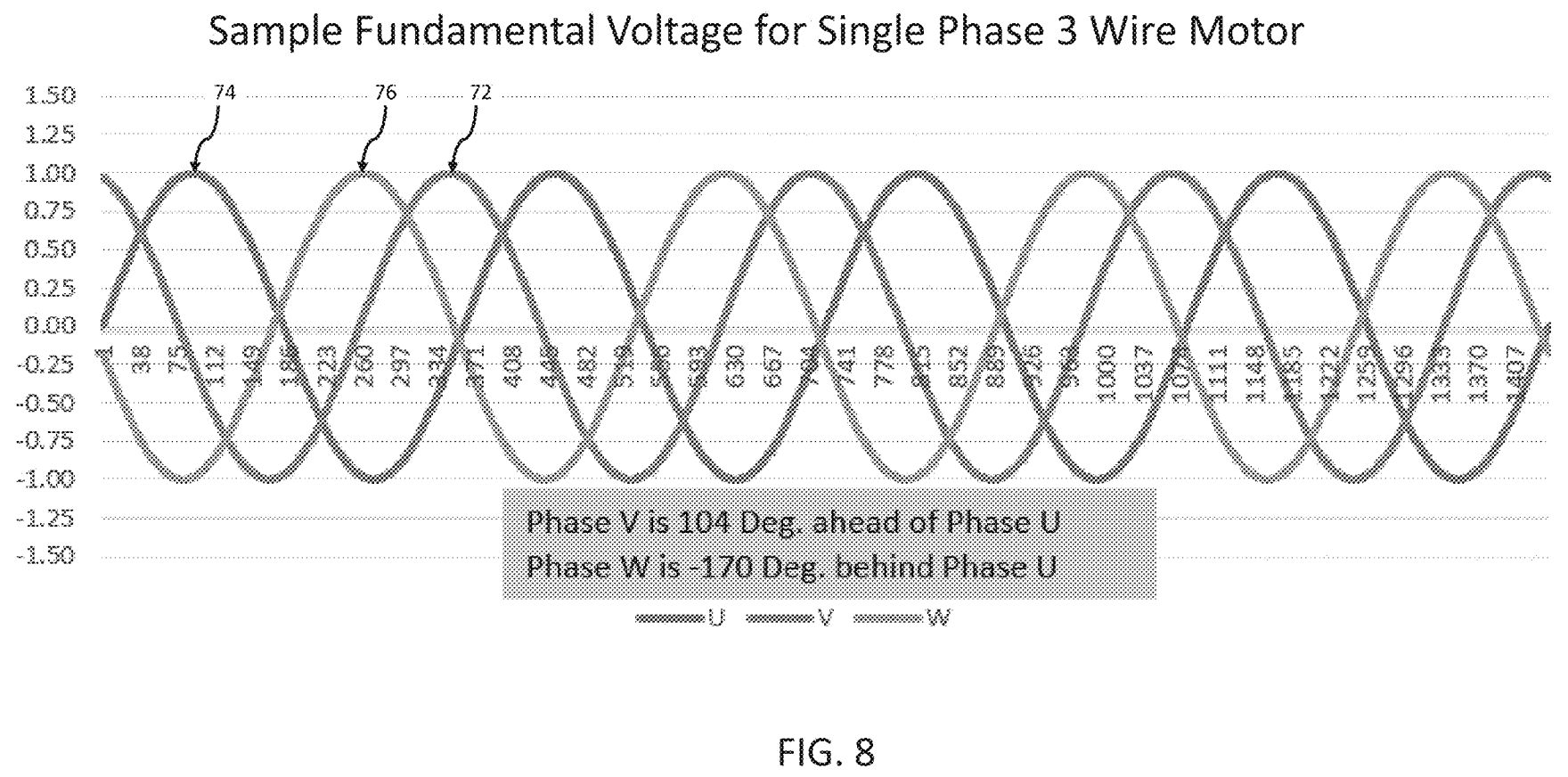

Sample Fundamental Voltage for Single Phase 3 Wire Motor 74
76
72

1.50 1.25 1.00 0.75 0.50 0.25 0.00 -0.25 -0.50 -0.75 -1.00 -1.25 -1.50

1 38 75 112 149 186 223 260 297 334 371 408 445 482 519 556 593 630 667 704 741 778 815 852 889 926 963 1000 1037 1074 1111 1148 1185 1222 1259 1296 1333 1370 1407

Phase V is 104 Deg. ahead of Phase U
Phase W is -170 Deg. behind Phase U

SYSTEM AND METHOD FOR COMMON MODE VOLTAGE REDUCTION FOR SINGLE PHASE 3 WIRE MOTOR

FIELD

The present disclosure pertains to motor drives, and more particularly for control systems for variable frequency drives using a sinusoidal pulse width modulation technique to reduce common mode voltage in single phase 3 wire motors.

BACKGROUND

It is known to control the operation of a motor that drives a load (e.g., a pump) using a variable frequency drive that produces, using pulse width modulation ("PWM"), an emulated three-phase sinusoidal waveform that controls the speed of operation of the pump. In conventional sinusoidal PWM, the phase differences between the voltage signals frequently generates instances of unacceptably high common mode voltage. Such high common mode voltage levels can result in increased motor heating, destructive bearing currents and electromagnetic interference. While these problems may in some applications be at least partially eliminated using hardware (e.g., large common mode chokes), such hardware is expensive and may be difficult to install due to size constraints. Accordingly, there exists a need to provide a control approach for a motor drive that reduces common mode voltage without requiring additional hardware.

SUMMARY

In one embodiment, the present disclosure provides a method for reducing common mode voltage in a three-phase pulse width modulated ("PWM") system that includes a controller and an inverter connected to a single phase 3 wire motor by a cable, the method comprising: controlling, by the controller, operation of a plurality of switches of the inverter to generate three voltage signals provided to the motor over the cable that emulate a three-phase sinusoidal waveform using a sinusoidal PWM ("SPWM") configuration; phase shifting the three voltage signals by selecting a duty cycle overlap width; identifying six sectors of the three-phase sinusoidal waveform based upon duty cycles of the three voltage signals; identifying, for each of the six sectors, a Mid duty cycle and a Max duty cycle out of the three voltage signals; determining, at a plurality of points for each of the six sectors, whether the identified Mid duty cycle is adjacent to the identified Max duty cycle; and increasing, for each of the plurality of points, any Mid duty cycle that is adjacent to a corresponding Max duty cycle by the duty cycle overlap width; wherein controlling operation of the plurality of switches includes modifying the SPWM configuration to reduce instances where a first set of switches of the plurality of switches coupled to a positive voltage are simultaneously ON or simultaneously OFF, or where a second set of switches of the plurality of switches coupled to a negative voltage are simultaneously ON or simultaneously OFF. In one aspect of this embodiment, modifying the SPWM configuration includes using one of a High Low High configuration or a Low High Low configuration for each of the six sectors. In another aspect, for each of the six sectors, the identified Mid duty cycle is adjacent to the identified Max duty cycle when an absolute value of a sum of the Mid duty cycle and the Max duty cycle is less than the selected duty cycle overlap width plus one. In another aspect, identifying the six sectors includes identifying points where one of the three voltage signals crosses another of the three voltage signals. In yet another aspect, for each of the six sectors, the Mid duty cycle is located between two of the three voltage signals. In another aspect, the selected duty cycle overlap width is related to a fundamental speed of the motor. In still another aspect of this embodiment, the selected duty cycle overlap width is based upon a dead band set for the SPWM configuration and a phase relationship among the three voltage signals. In another aspect, selecting the duty cycle overlap width includes setting an initial duty cycle overlap width equal to a dead band duration of the SPWM configuration, then adjusting the initial duty cycle overlap width to identify a final duty cycle overlap width that reduces the common mode voltage.

According to another embodiment of the present disclosure a system is provided for reducing common mode voltage generated during operating of a single phase 3 wire motor, comprising: a controller; a memory device storing instructions; an inverter controlled by the controller according to the instructions; wherein execution of the instructions by the controller causes the controller to: control operation of a plurality of switches of an inverter to generate three voltage signals provided to the motor that emulate a three-phase sinusoidal waveform using a sinusoidal PWM ("SPWM") configuration; phase shift the three voltage signals using a duty cycle overlap width; identify six sectors of the three-phase sinusoidal waveform based upon duty cycles of the three voltage signals; identify, for each of the six sectors, a Mid duty cycle and a Max duty cycle out of the three voltage signals; determine, at a plurality of points for each of the six sectors, whether the identified Mid duty cycle is adjacent to the identified Max duty cycle; increase, for each of the plurality of points, any Mid duty cycle that is adjacent to a corresponding Max duty cycle by the duty cycle overlap width; and modify the SPWM configuration to reduce instances where a first set of switches of the plurality of switches coupled to a positive voltage are simultaneously ON or simultaneously OFF, or where a second set of switches of the plurality of switches coupled to a negative voltage are simultaneously ON or simultaneously OFF. In one aspect of this embodiment, the modified SPWM configuration includes using one of a High Low High configuration or a Low High Low configuration for each of the six sectors. In another aspect, for each of the six sectors, the identified Mid duty cycle is adjacent to the identified Max duty cycle when an absolute value of a sum of the Mid duty cycle and the Max duty cycle is less than the duty cycle overlap width plus one. In another aspect, identifying the six sectors includes identifying points where one of the three voltage signals crosses another of the three voltage signals. In another aspect, for each of the six sectors, the Mid duty cycle is located between two of the three voltage signals. In another aspect, the duty cycle overlap width is related to a fundamental speed of the motor. In another aspect, the duty cycle overlap width is based upon a dead band set for the SPWM configuration and a phase relationship among the three voltage signals. In yet another aspect, the duty cycle overlap width is determined by setting an initial duty cycle overlap width equal to a dead band duration of the SPWM configuration, then adjusting the initial duty cycle overlap width to identify a final duty cycle overlap width that reduces the common mode voltage.

In another embodiment of the present disclosure, a non-transitory computer-readable medium with an executable program stored thereon is provided for reducing common mode voltages in a three-phase pulse width modulated ("PWM") system that includes an inverter connected to a single phase 3 wire motor, wherein the program instructs a controller to perform the following steps: control operation of a plurality of switches of the inverter to generate three voltage signals provided to the motor that emulate a three-phase sinusoidal waveform using a sinusoidal PWM ("SPWM") configuration; phase shift the three voltage signals using a duty cycle overlap width; identify six sectors of the three-phase sinusoidal waveform based upon duty cycles of the three voltage signals; identify, for each of the six sectors, a Mid duty cycle and a Max duty cycle out of the three voltage signals; determine, at a plurality of points for each of the six sectors, whether the identified Mid duty cycle is adjacent to the identified Max duty cycle; increase, for each of the plurality of points, any Mid duty cycle that is adjacent to a corresponding Max duty cycle by the duty cycle overlap width; and modify the SPWM configuration to reduce instances where a first set of switches of the plurality of switches coupled to a positive voltage are simultaneously ON or simultaneously OFF, or where a second set of switches of the plurality of switches coupled to a negative voltage are simultaneously ON or simultaneously OFF. In one aspect of this embodiment, for each of the six sectors, the identified Mid duty cycle is adjacent to the identified Max duty cycle when an absolute value of a sum of the Mid duty cycle and the Max duty cycle is less than the duty cycle overlap width plus one. In another aspect, identifying the six sectors includes identifying points where one of the three voltage signals crosses another of the three voltage signals. In another aspect, the duty cycle overlap width is related to a fundamental speed of the motor.

BRIEF DESCRIPTION OF THE DRAWINGS

The above-mentioned and other advantages and objects of this disclosure, and the manner of attaining them, will become more apparent, and the disclosure itself will be better understood, by reference to the following description of embodiments of the invention taken in conjunction with the accompanying drawings, wherein:

FIG. 8 is a graph depicting an example of fundamental voltage signals for a single phase 3 wire motor;

Figure 1:
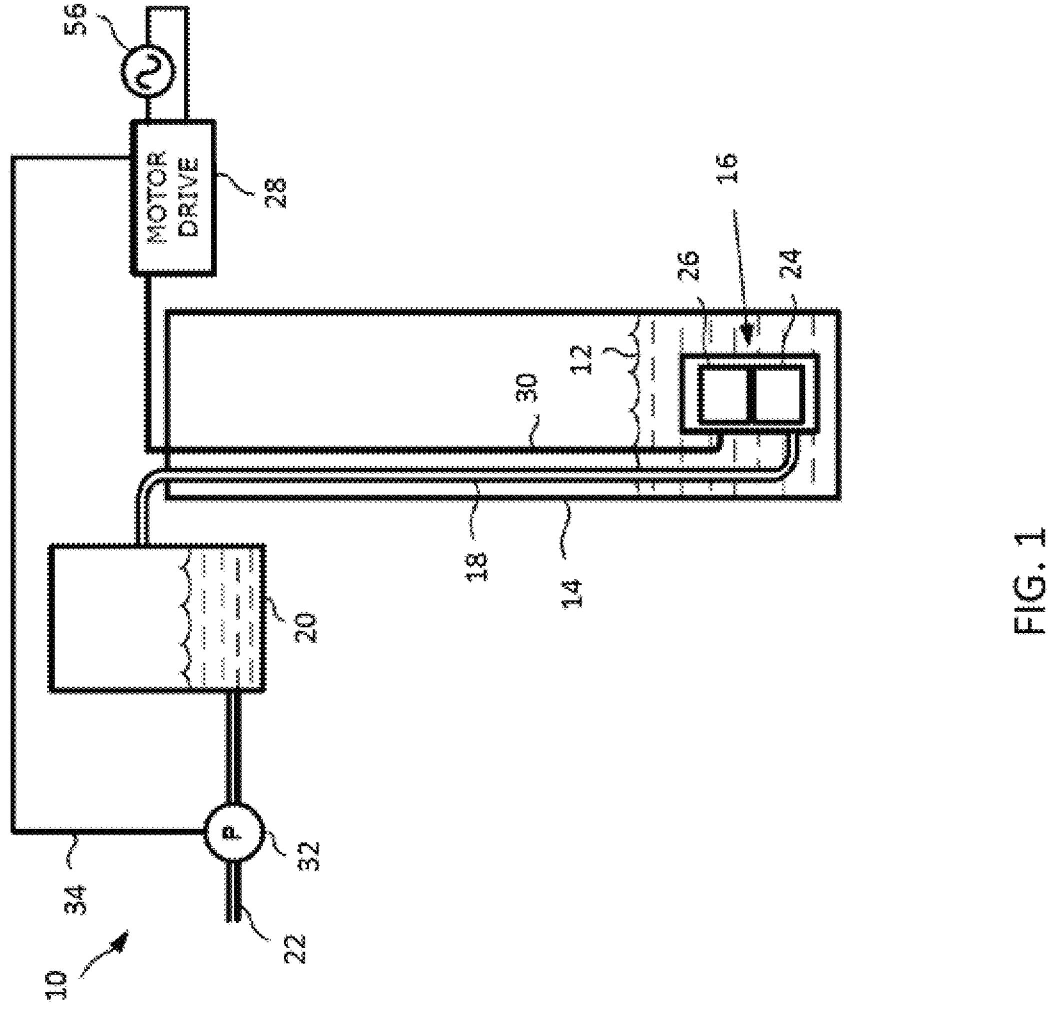
FIG. 1 is a conceptual view of a pump system.

Corresponding reference characters indicate corresponding parts throughout the several views. Although the drawings represent embodiments of the present disclosure, the drawings are not necessarily to scale, and certain features may be exaggerated or omitted in some of the drawings in order to better illustrate and explain the present disclosure.

DETAILED DESCRIPTION

Referring to FIG. 1, a diagrammatic representation of a liquid supply or pump system 10 is shown. Example liquids include water, gasoline fuel, diesel fuel, petroleum, oil, sewage, and combinations of such liquids with gases and solids, such as water and coal-based methane gas. In the description below, the liquid is referred to as water 12 and the pump is described as a deep well pump. The teachings of the present disclosure, however, apply to a variety of different applications. The liquid supply system 10 comprises a reservoir 14 containing water 12 which is pumped by a pump unit 16 through a conduit 18, optionally via another reservoir 20, e.g., a pressure tank, to a conduit 22 of a closed system. The submersible or immersive pump unit 16 includes a pump 24 driven by a motor 26 which is powered by a motor drive 28 via power conductors 30. The size of reservoir 14, which is interposed between the pump unit 16 and a pressure sensor or transducer 32, affects the response of the system. In one example, the motor drive 28 is a variable frequency drive and pump 24 is a centrifugal pump. The motor drive 28 may be referred to hereinafter as "the VFD 28." Power conductors 30 may comprise two or more wires to provide single or three phase power to motor 26. In the described embodiments, the motor 26 is a single phase 3 wire motor.

During operation of the system, water 12 flows out of conduit 18. For example, the system may be a water system in a home, in which case water flows out of conduit 22 when a faucet is opened or an irrigation system is turned on. Fluid characteristics including pressure may be monitored with the pressure sensor 32 disposed in conduit 22 to generate a pressure signal useful to maintain pressure about a setpoint. The pressure signal is provided via line 34 connecting the pressure sensor 32 and the motor drive 28.

Although the embodiments may be described with reference to liquids, particularly water, the invention is not so limited. Generally, the embodiments are applicable to any rotary fluid displacement machine driven by a motor with a variable speed drive, including a variable frequency drive. As used herein rotary fluid displacement machines include pumps, fans, ventilators, turbines, radial compressors and other machines having a rotating element provided to displace a fluid.

Figure 2:
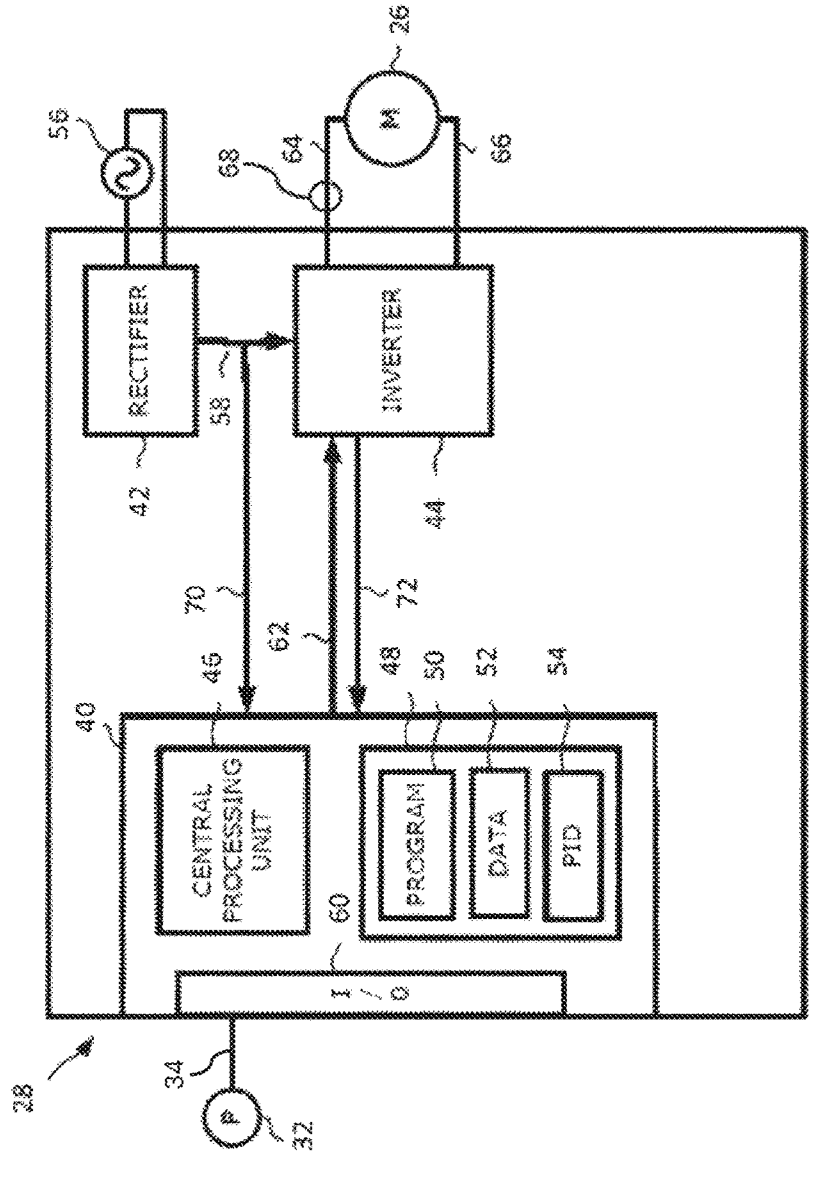
FIG. 2 is a block diagram of a motor drive for use with the pump system of FIG. 1.

FIG. 2 illustrates an embodiment of motor drive 28 comprising a processing device, illustratively controller 40, a rectifier 42 and an inverter 44. As shown, controller 40 includes a CPU 46 configured to access a memory device 48 and execute processing instructions from a program module, exemplified by program 50, based on data 52. Another example of a program module is shown as PID module 54. PID module 54 may also be comprised in a hardware module communicatively coupled to CPU 46.

Techniques for generating motor voltages according to characteristics of a control signal are known in the art. In one example, a technique comprises storing values in a table corresponding to samples of an operating curve. The operating curve is typically a substantially straight line defining a volts-hertz relationship. When the speed control system determines a desired operating speed, which defines an operating frequency, the motor drive 28 looks up a voltage corresponding to the frequency. The motor drive 28 then generates a motor voltage based on the voltage and the frequency. In another example, a formula or a function embodying the operating curve characteristics is used by CPU 46 to generate the desired motor voltages.

Rectifier 42 is powered by a power source 56 and includes any rectification circuit well known in the art, e.g., a diode bridge, to convert three phase alternating-current (AC) voltage supplied by the power source 56 into direct-current (DC) voltage which it supplies, after smoothing, to the inverter 44. The rectifier 42 includes a plurality of diodes connected in parallel which allow the positive portions of the three phase AC voltage to pass to the inverter 44. The inverter 44 receives DC power from the rectifier 42 through a conductor 58 and converts the DC power into an AC motor power. The power source 56 may comprise a single phase two-wire supply, a single phase three-wire supply, or a three-phase supply.

The CPU 46 receives inputs through an I/O interface 60 and outputs control signals over line 62 to the inverter 44. In one example, the control signal, e.g., speed reference, is provided to a pulse-width-modulated (PWM) module having power switches and control logic which generates the appropriate gating signals for the power switches to convert the DC power supplied by the rectifier 42 to the AC motor voltage suitable to drive the motor 26 according to the control signal, provided to the motor 26 via conductors 64, 66 which may be housed within a long cable as is further described below. As used herein, the phrase "long cable" generally refers to a cable of sufficient length to extend from a surface location above a well to a location of a pump motor 26 near the bottom of the well. In some applications, a long cable is over 1,000 feet long. In other applications, a long cable is over 500 feet long. In still other applications, a long cable is over 100 feet long. In still other embodiments, a long cable is over 50 feet long. Current drawn by the motor 26 from the inverter 44 is sensed by a current sensor 68 and a current signal is provided by the current sensor 68 to the CPU 46. Motor voltage feedback can also be provided, for example through conductor 72 connecting the inverter 44 and the controller 40. Motor voltages may also be generated with other known or later developed drive topologies programmed in accordance with embodiments of the disclosure.

In a more general embodiment, the controller comprises control logic operable to generate the control signal. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

Figure 3:
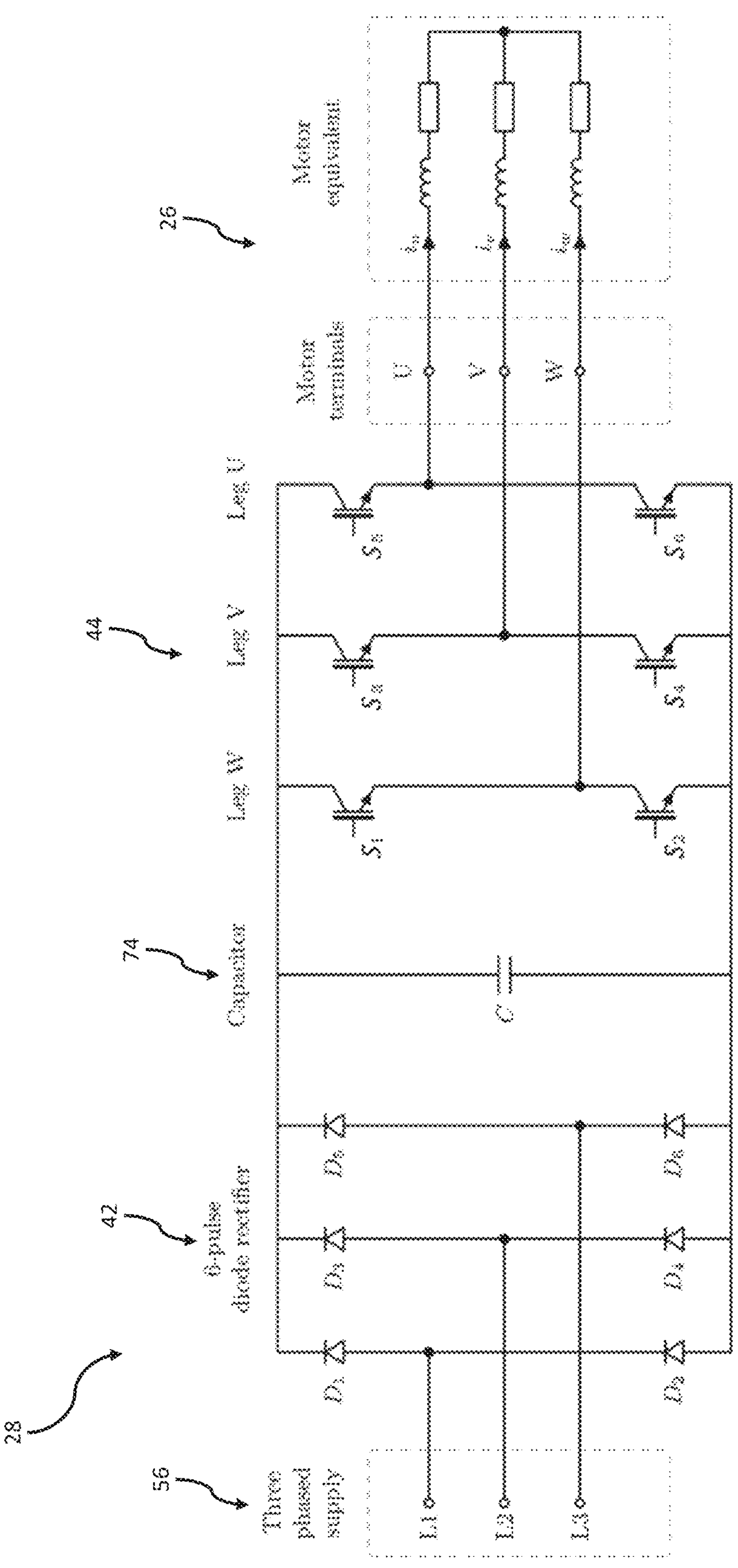
FIG. 3 is a schematic diagram of a prior art inverter topology for a motor drive.

Referring now to FIG. 3, a known inverter topology for the motor drive 28 is shown. Three phase AC supply voltage is provided on lines L1, L2 and L3 by the power source 56. As indicated above, the three phase AC voltage is rectified by the three phased diode rectifier 42 to produce a DC output which is smoothed by the capacitor 74 placed between the +DC line and the −DC line of the DC link. This DC voltage is provided to the six transistors or switches $S_1$-$S_6$ of the three phase H-bridge inverter 44, which generates three phase voltage vectors using a special pattern of Pulse Width Modulated ("PWM") signals provided by the controller 40 as is further described below. The output signals of the inverter 44 are provided, in some cases over a long cable (including conductors 64, 66), to the U, V and W terminals of the motor 26. The PWM technique used in embodiments described herein is known as Sinusoidal PWM ("SPWM").

Conventional SPWM has shortcomings, including problems associated with large magnitude and high frequency common mode voltage ("CMV"). CMV causes electromagnetic interference ("EMI") and can have destructive effects on motor windings and insulation, or cause bearing failure for variable speed drives. The common mode current is defined as sum-total of all the currents flowing through the output conductors. Stray capacitances of the cable between the motor and the motor drive (i.e., motor conductors 64, 66) and internal to the motor are possible paths for this current and a source of EMI noise problems.

Figure 4:
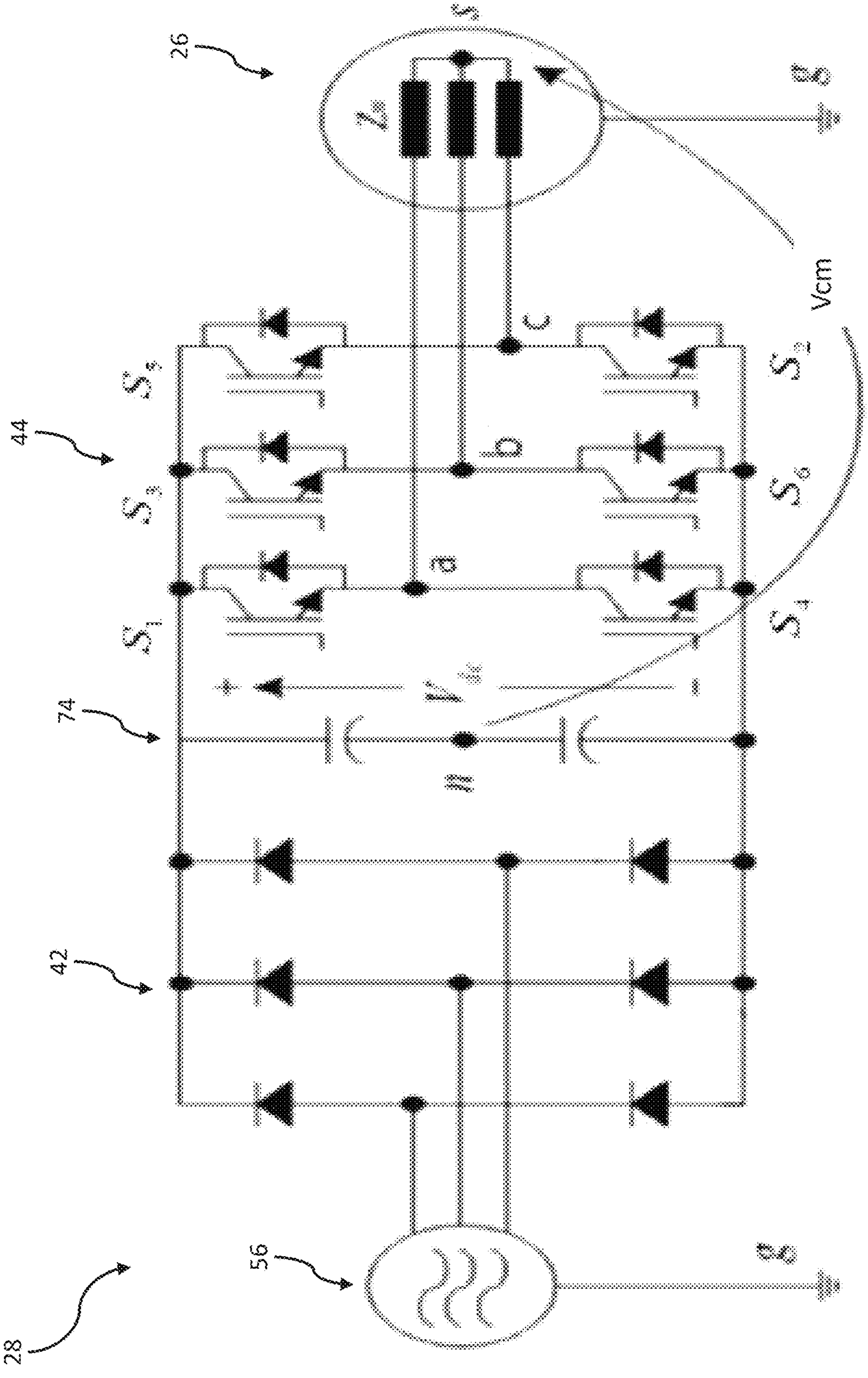
FIG. 4 is a simplified schematic diagram of the topology of FIG. 3.

Referring now to FIG. 4, CMV can be defined as the voltage difference at the neutral point between the three-phase load and the DC power (i.e., $V_{cm}$). $V_{cm}$ represents the sum of the voltages of the three poles of the inverter 44. Mathematically, $V_{cm}=(V_{an}+V_{bn}+V_{cn})/3$, where $V_{an}$ is the voltage across phase A and the neutral point, n, $V_{bn}$ is the voltage across phase B and the neutral point, n, and $V_{cn}$ is the voltage across phase C and the neutral point, n.

Figure 5:
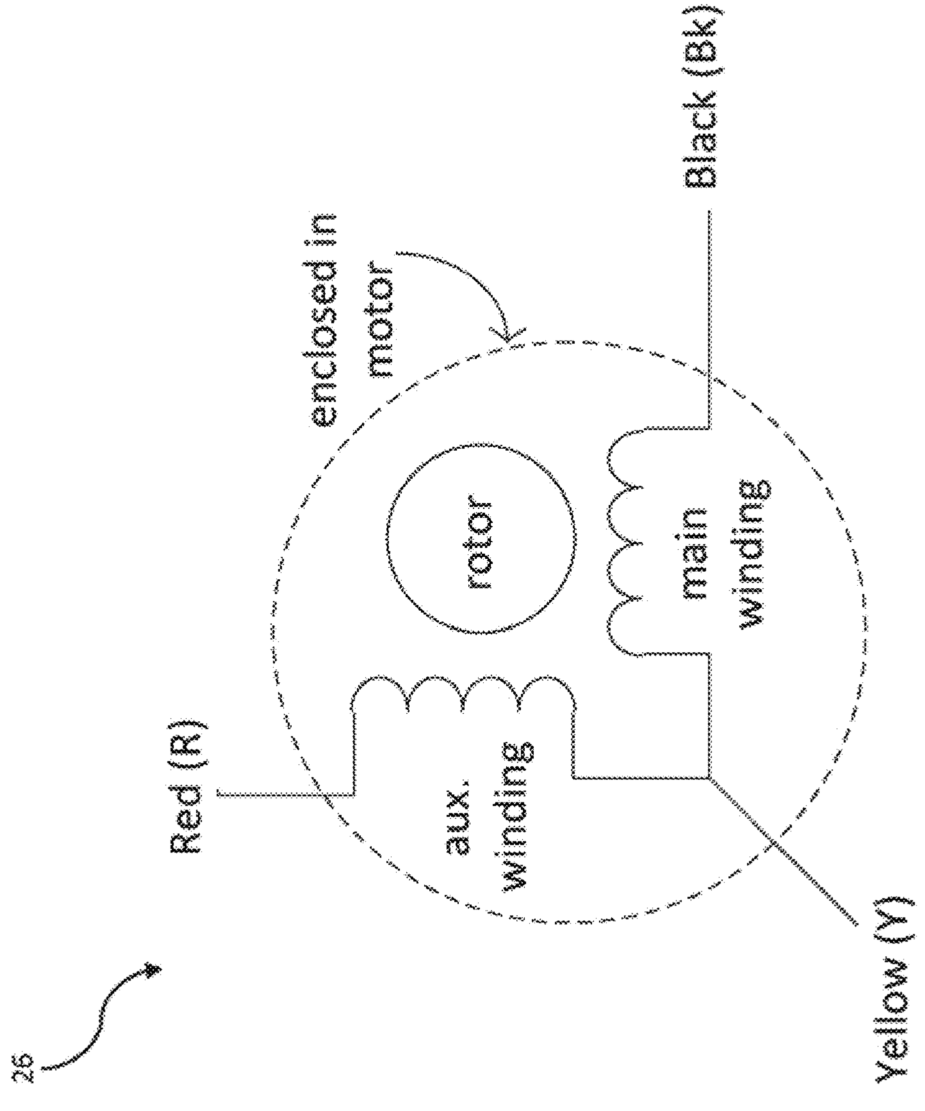
FIG. 5 is a simplified schematic diagram of electrical connections of a 3 wire motor.

As indicated above, the teachings of the present disclosure have particular applicability for control of single phase 3 wire motors 26. As such, a brief description of such motors 26 will provide context for the description of the CMV reduction techniques according to the present disclosure. Referring to FIG. 5, a single phase AC induction motor is shown in which both an auxiliary winding and a main winding are electrically accessible external to the motor 26. Specifically, there are three power wires and a green-wire ground connected to the motor; hence the 3 wire designation for this type of motor 26. Conventionally, a yellow (Y) wire is connected to a point of common connection of the auxiliary winding (often designated as the start winding) and the main winding, a black (Bk) wire is connected to the other end of the main winding, and a red (R) wire is connected to the other end of the auxiliary winding. In contrast, a 2 wire single phase motor has only two wires plus the green-wire ground, providing external electrical access to only a main winding, with the start winding connected/disconnected internally.

A single phase 3 wire motor 26 is typically operated at 60 Hz with a start capacitor providing the requisite phase shift between the start winding and the main winding voltage. After the motor 26 reaches running speed, the start capacitor is disconnected leaving only the main winding connected. In other cases, a different capacitor may be left in series with the start winding, so that both windings carry current during running.

The operation of a single phase 3 wire motor 26 using the VFD 28 depicted in FIG. 2 is similar to having cap-run operation: both windings carry current at all times. Further, with the VFD 28, the voltage at all three points, R, Y and Bk, can be defined independently. Specifically, the common point, Y, will not be a neutral or ground point.

In a conventional 2-pole, single phase 3 wire motor, a start winding is physically positioned on the stator offset 90 degrees from the position of the main winding. Initially, then, it may be expected that smoothest motor operation would occur if the VFD 28 provided equal amp-turns to the two windings, 90 degrees out of phase. In practice, differences between the two windings, unique to each motor design, shift the desired angle to less than 90 degrees.

As indicated above, the VFD 28 provides equal voltages at each of the three motor connections, with specified angles between the voltages. In other words, the VFD 28 provides equal voltage magnitude relative to neutral at each "phase": |VYN|=|VRN|=|VBkN|. The selection of the angles determines the phase and magnitude of the auxiliary winding voltage relative to the main winding voltage.

Figure 6:
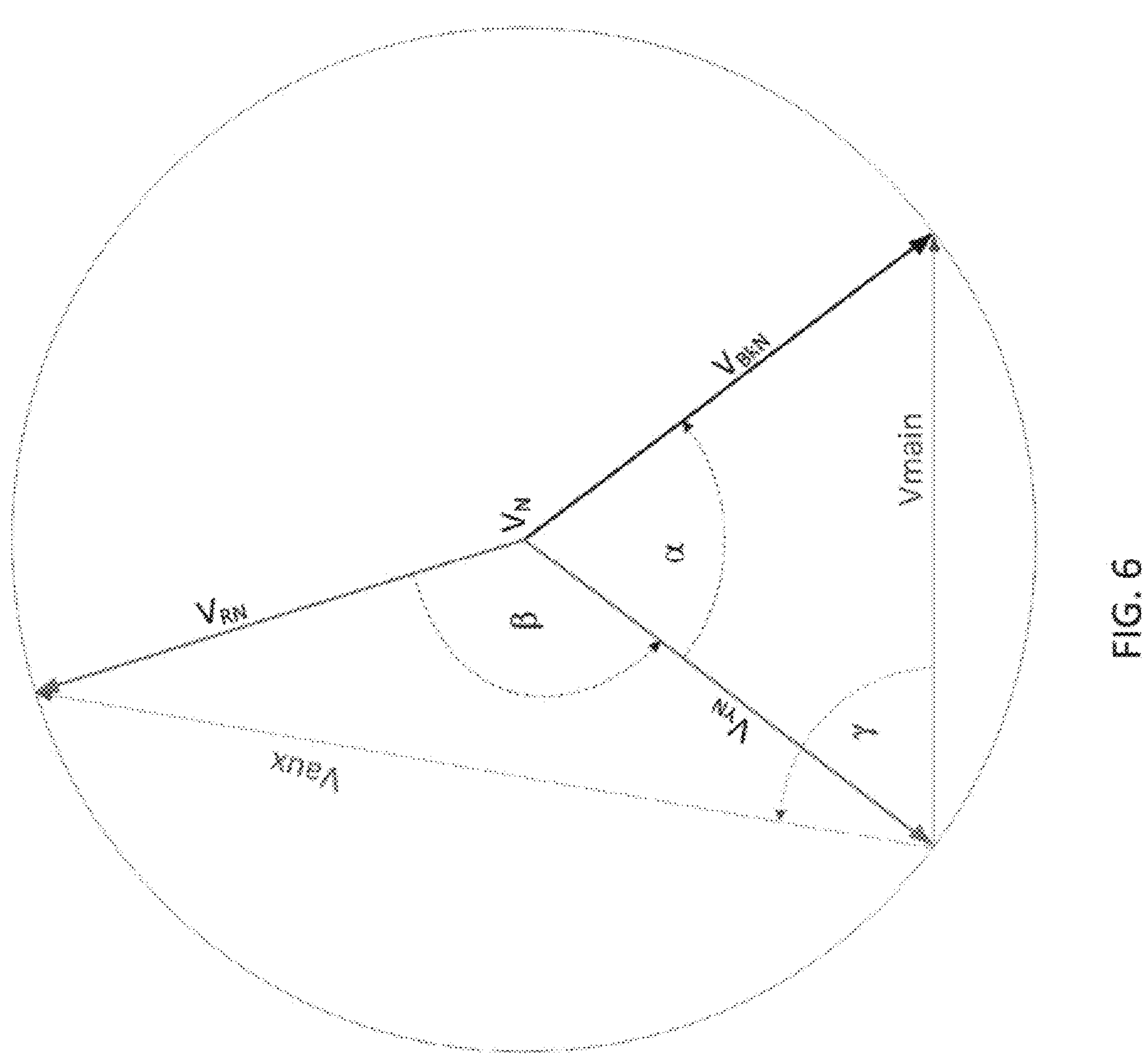
FIG. 6 is a phasor diagram depicting relationships between the voltages depicted in FIG. 5.

These phase angles are fixed for each motor. The magnitude of the voltage is adjusted in response to the commanded speed to accomplish drive operations. Referring to FIG. 6 and taking the voltage at the common point, VYN, as the phase reference, the phase angles to the other voltages are shown. The voltage VBkN leads VYN, while voltage VRN lags behind VYN. Note that the neutral point is a conceptual voltage node. In other words, the neutral voltage may not represent a voltage available at a hardware connection. It corresponds to the mid-point of the DC bus voltage but not, in general, a safety ground or an input AC neutral point. The values of physical winding voltages are not impacted by the conceptual nature of the neutral point, since the motor winding voltages are differences between pairs of "phase"-to-neutral voltages.

Figure 7:
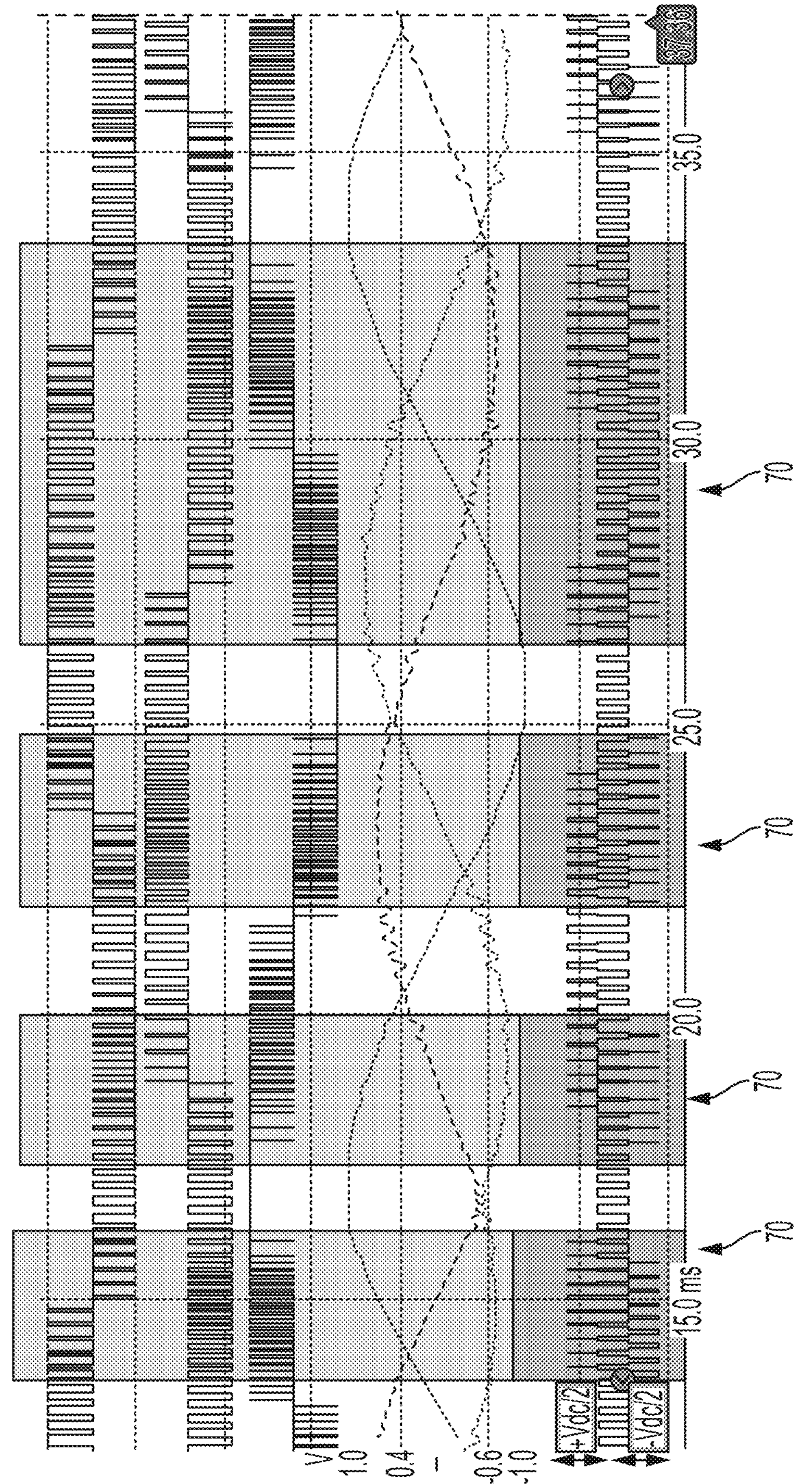
FIG. 7 is a graph depicting an electrical cycle of conventional PWM control signals for a single phase 3 wire motor and the resulting common mode voltage.

Referring now to FIG. 7, using conventional SPWM for a single phase 3 wire motor 26, $V_{cm}$ is frequently at a $+V_{dc}/2$ or $-V_{dc}/2$ level (see highlighted areas 70) across most of the 360-degree electrical cycle. More specifically, when all upper switches $S_1$, $S_3$ and $S_5$ or all lower switches $S_2$, $S_4$ and $S_6$ of the three phase H-bridge inverter 44 are simultaneously active, $V_{cm}$ reaches its maximum level (i.e., either $+V_{dc}/2$ or $-V_{dc}/2$). However, in normal operation, when all upper switches $S_1$, $S_3$ and $S_5$ and all lower switches $S_2$, $S_4$ and $S_6$ of the three phase H-bridge inverter 44 are not simultaneously active, $V_{cm}$ is reduced to about $+/-V_{dc}/6$.

The occurrence of $V_{cm}$ at the higher $V_{dc}/2$ level is particularly significant, as it contributes to increased common mode current. As indicated above, this high common mode current can lead to problems such as increased motor heating, bearing currents, and electromagnetic interference ("EMI"). Stray capacitances in the motor cable and within the motor itself can serve as paths for this unwanted common mode current, emphasizing the importance of addressing these potential routes to minimize EMI noise issues. Filters are often employed to mitigate common mode currents and reduce EMI. Adding filters, however, such as common mode chokes or capacitors, to the circuit can increase costs.

The frequency and distribution of the instances of $V_{cm}$ at $+/-V_{dc}/2$ depend on the phase relationship between the voltage signals. According to the present disclosure, these large $V_{cm}$ levels are mitigated through the careful modulation of the PWM signals. In particular, according to the teachings of the present disclosure, the phase difference between the voltage signals can influence the $V_{cm}$ characteristics and the resulting common mode current.

Referring now to FIG. 8, for the single phase 3 wire motors 26 described above, the relationship between the phases is not in multiples of 120 degrees (as in a conventional three phase motor). In single phase 3 wire motors 26, the output voltages are unbalanced by nature, which results in the unbalanced current needed for the correct operation of these types of motors. In the sample fundamental voltage graph of FIG. 8, the phase V voltage 72 is 104 degrees ahead of the phase U voltage 74, and the phase W voltage 76 is −170 degrees behind the phase U voltage 74. The phase U current is the lowest current as compared to the phase V and phase W current.

Generally speaking, the CMV reduction technique of the present disclosure creates a phase shifted three phase waveform for a single phase 3 wire motor 26 using SPWM by selecting a duty cycle overlap width (Td_val, described below), identifying the sectors of the waveform based upon the three phase voltage duty cycles, then identifying the Mid and Max duty cycles out of the three phases. If the Mid and Max duty cycles are in close range, which in certain embodiments means the sum of the Mid and Max duty cycles is less than (Td_val+1), then the Mid duty cycle is increased by Td_val and the process is repeated for all points in the 360-degree electrical cycle as is further described below. Finally, the PWM generator configuration is modified based upon the position of the voltage vector within the 360-degree electrical cycle as is described below.

Figure 9:
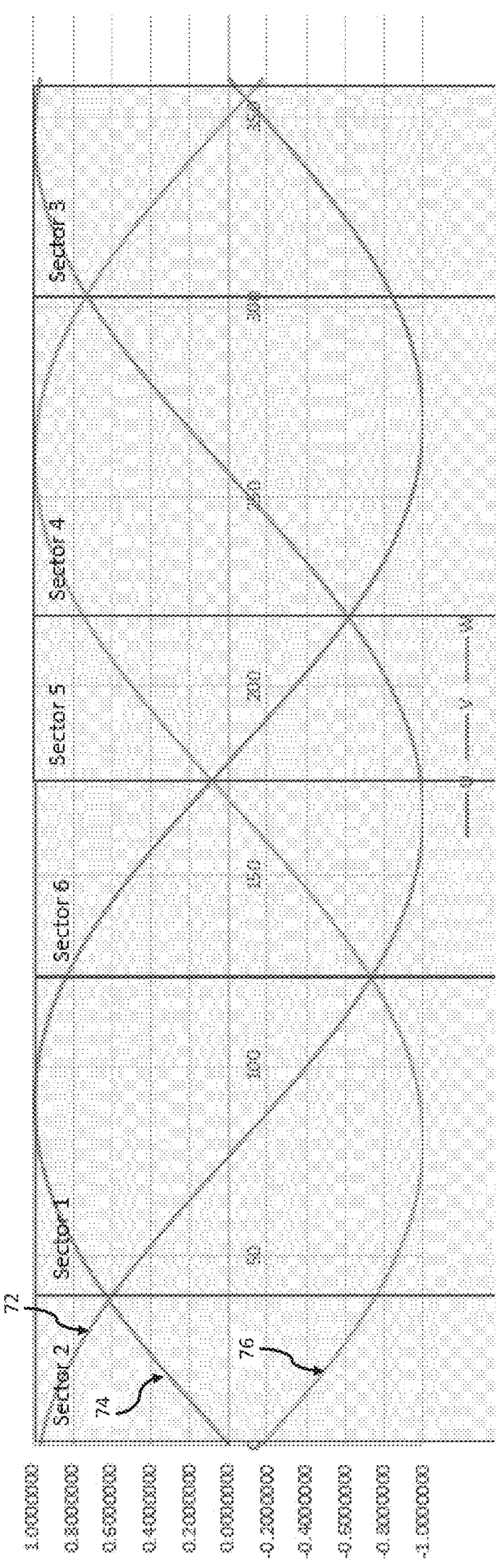
FIG. 9 is a graph of an example electrical cycle depicting vector identification according to the principles of the present disclosure.

Referring now to FIG. 9, a graph depicting an example of sector identification is shown. More specifically, the phase V voltage 72, the phase U voltage 74 and the phase W voltage 76 are shown for approximately an entire 360-degree electrical cycle. As shown, sector 2 is identified as the range between zero degrees and the angle (approximately 40 degrees) at which the positive portion of the phase U voltage 74 crosses the positive portion of the phase V voltage 72. Sector 1 is identified as the range between the end of sector 2 and the angle (approximately 120 degrees) at which the negative portion of the phase V voltage 72 crosses the negative portion of the phase W voltage 76. Sector 6 is identified as the range between the end of sector 1 and the angle (approximately 175 degrees) at which the positive portion of the phase W voltage 76 crosses the positive portion of the phase U voltage 74. Sector 5 is identified as the range between the end of sector 6 and the angle (approximately 220 degrees) at which the negative portion of the phase U voltage 74 crosses the negative portion of the phase V voltage 72. Sector 4 is identified as the range between the end of sector 5 and the angle (approximately 305 degrees) at which the positive portion of the phase V voltage 72 crosses the positive portion of the phase W voltage 76. Finally, sector 3 is identified as the range between the end of sector 4 and 360-degrees.

Table 1 below shows the identification of the Mid, Max and Min duty cycles of the three phase voltages relative to one another as depicted in FIG. 9 for each of the six sectors.

TABLE 1

| Sector | Phase U 74 Duty Cycle | Phase V 72 Duty Cycle | Phase W 76 Duty Cycle |
|---|---|---|---|
| 1 | Max | Mid | Min |
| 2 | Mid | Max | Min |
| 3 | Min | Max | Mid |
| 4 | Min | Mid | Max |
| 5 | Mid | Min | Max |
| 6 | Max | Min | Mid |

As shown in Table 1 and FIG. 9, throughout sector 1 the phase V voltage 72 is between (i.e., the middle or Mid duty cycle) the phase U voltage 74 and the phase W voltage 76. The phase U voltage 74 is the maximum duty cycle throughout sector 1 and the phase W voltage 76 is the minimum duty cycle throughout sector 1. Similarly, throughout sector 2 the phase U voltage 74 is between (i.e., the middle or Mid duty cycle) the phase V voltage 72, which is the maximum duty cycle, and the phase W voltage 76, which is the minimum duty cycle. The same Mid duty cycle identification approach is used for the remaining sectors 3 through 6.

The duty cycle overlap width, Td_val, is related to the fundamental speed of the motor 26. Td_val helps to reduce the harmonic distortion in the output phase current at various fundamental speeds. Td_val is partially dependent on the dead band that is set for the PWM configuration and the phase relationship of the 3 wire motors. These two dependencies drive the selection of Td_val. In one embodiment, the Td_val is selected such that it is the same as the dead band duration and then the Td_val is swept across different phase relationships of the 3-phase vector for the 3-wire motor. In other words, the TD_val is manually modified to identify a combination of 3 phase switches with ON/OFF durations (i.e., duty cycle) that will result in higher $V_{cm}$ (i.e., $+/-V_{dc}/2$) and then the PWM configuration is manipulated slightly such that the overall average output is least affected and the $V_{cm}$ of $+/-V_{dc}/2$ is eliminated.

When a duty cycle is modified using Td_val to achieve a lower $V_{cm}$, more distortion is created in voltage, and therefore in current. The distortion is higher at lower speeds and lower at higher speeds. Accordingly, an appropriate selection of Td_val reduces the distortion caused by modifying a duty cycle.

After the Mid and Max duty cycles are identified for each sector 1-6 as described above, the relative closeness between the Mid and Max duty cycles for each sector 1-6 is identified to determine whether the Mid duty cycle needs to be modified. In certain embodiments, the threshold triggering a modification of the Mid duty cycle is when the absolute value of the Mid duty cycle plus the Max duty cycle is less than Td_val plus one (i.e., ABS(Mid+Max)<(Td_val+1)). For example, as shown in FIG. 9, at the point in sector 2 corresponding to zero degrees, the value of the Mid duty cycle (i.e., the value of the phase U voltage 74) is zero volts and the value of the Max duty cycle (i.e., the value of the phase V voltage 72) is approximately 1.0 volt. Accordingly, the absolute value of the sum of the Mid duty cycle and the Max duty cycle at that point is approximately 1.0 volt. At the point roughly corresponding to the end of sector 2 (i.e., at approximately 40 degrees), the sum of the Mid duty cycle and the Max duty cycle is approximately 1.2 volts. As should be apparent from the foregoing, in this example the absolute value of the sum of the Mid duty cycle and the Max duty cycle increases from approximately 1.0 volt to approximately 1.2 volts over the range of angles in sector 2 from zero degrees to approximately 40 degrees.

If the absolute value of the sum of the Mid and Max duty cycles at any point in a sector is less than the threshold of (Td_val+1), then the Mid duty cycle for that point is modified such that the New Mid Value equals the Mid duty cycle value at that point plus Td_val (i.e., New Mid Value=Mid+Td_val). The above-described process is repeated for all points in the 360-degree electrical cycle.

After the New Mid Values for the Mid duty cycles are modified in the manner described above, the PWM configuration is modified based upon the sector number. The modifications to the PWM configuration for each sector is reflected in Table 2 below.

TABLE 2

| Sector | Phase U PWM | Phase V PWM | Phase W PWM |
|---|---|---|---|
| 1 | High Low High | Low High Low | High Low High |
| 2 | High Low High | Low High Low | Low High Low |
| 3 | High Low High | High Low High | Low High Low |
| 4 | Low High Low | High Low High | Low High Low |
| 5 | Low High Low | High Low High | High Low High |
| 6 | Low High Low | Low High Low | High Low High |

Figure 10:
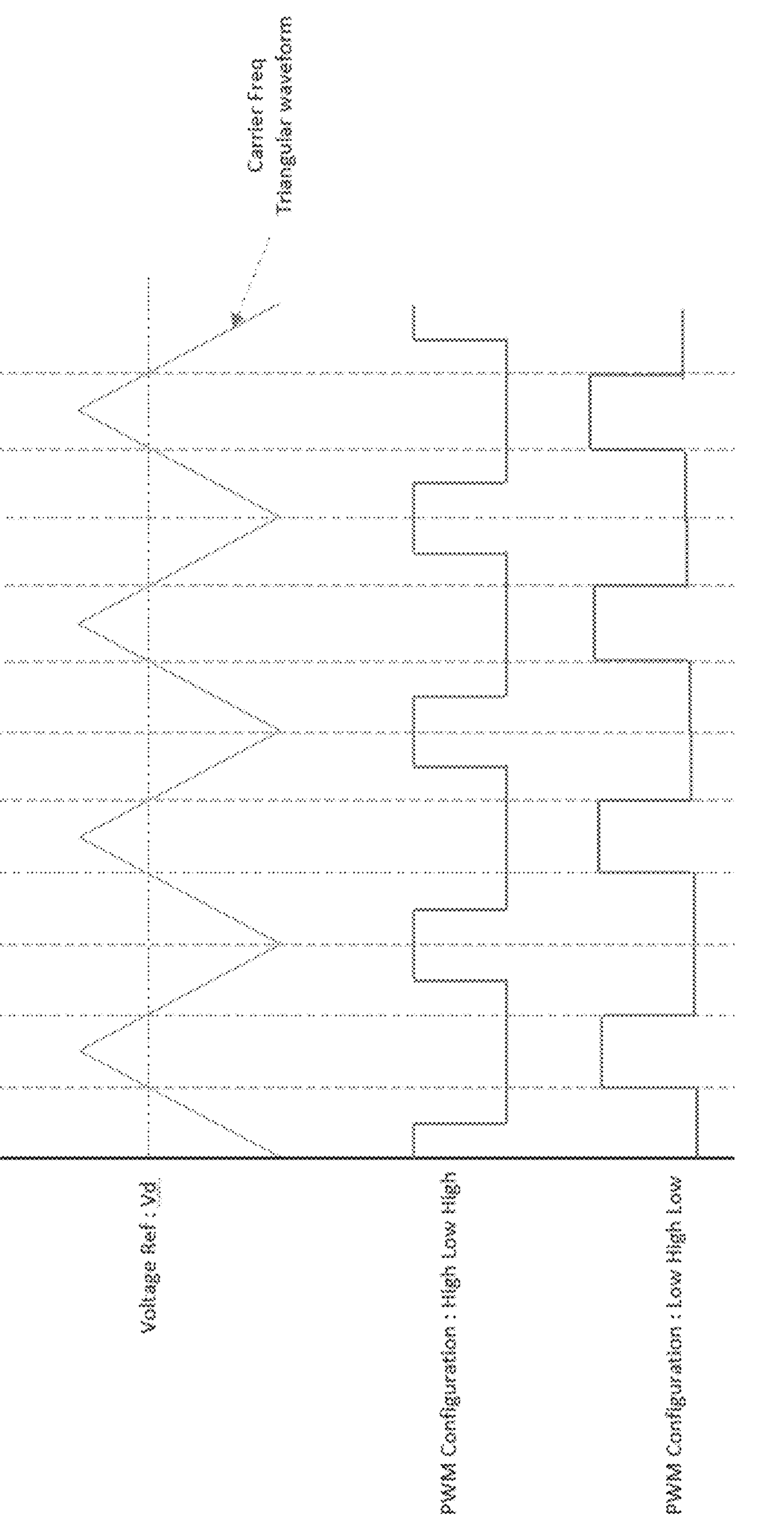
FIG. 10 is a graph depicting a high low high PWM configuration and a low high low PWM configuration.

By modifying the PWM configuration as set forth in Table 2, the process ensures that all upper switches or all lower switches are not simultaneously active. These changes in the PWM configuration result in switching at different instances, but the ON duration of the signals are not changed. For example, to generate a pulse of 60% duty cycle, any of a variety of approaches may be used. In one embodiment, the pulse may be 20% OFF, 60% ON then 20% OFF, resulting in a 100% cycle time with a 60% duty cycle. In another embodiment, the pulse may be 60% ON then 40% OFF, also resulting in a 100% cycle time with a 60% duty cycle. In yet another embodiment yielding a 60% duty cycle, the pulse may be 40% OFF then 60% ON. In still another embodiment yielding a 60% duty cycle, the pulse may be 30% ON, 40% OFF then 30% ON. As should be apparent from the foregoing, other combinations are possible. The present disclosure employs either a High Low High or a Low High Low PWM configuration as depicted in FIG. 10. This technique changes the ON and OFF locations of the pulse in a PWM cycle and a synchronization of the technique within all three phases helps to achieve the goal of avoiding situations where all upper switches are ON or OFF simultaneously or all lower switches are ON or OFF simultaneously. As indicated above, this reduces the instances of $+/-V_{dc}/2$ levels of $V_{CM}$. The remaining instances of $+/-V_{dc}/2$ levels of $V_{CM}$ are removed by manipulating the value of Td_val as described above.

Figure 11:
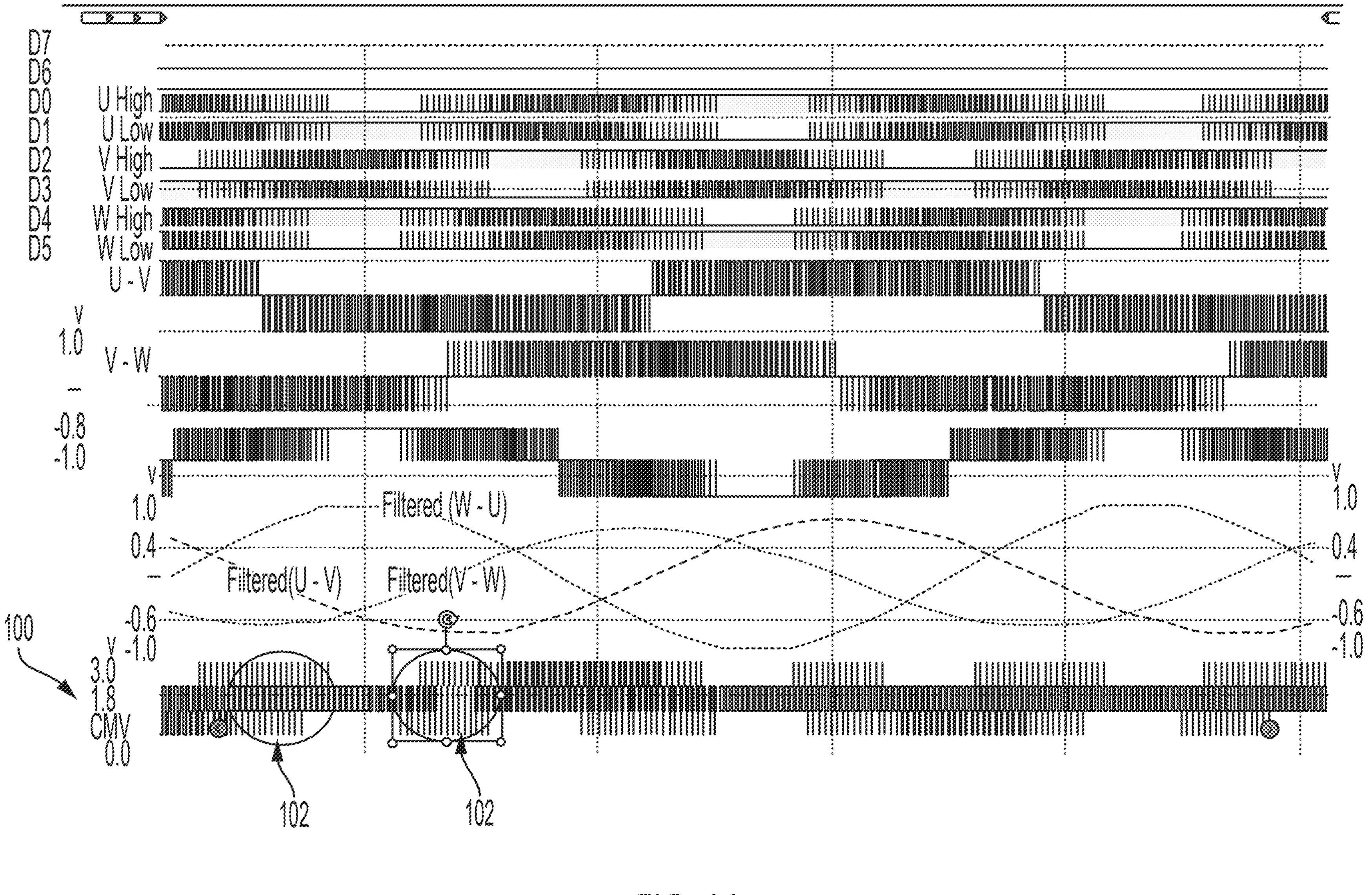
FIG. 11 is a graph depicting a conventional sinusoidal PWM approach for controlling a single phase 3 wire motor and the associated common mode voltage.
Figure 12:
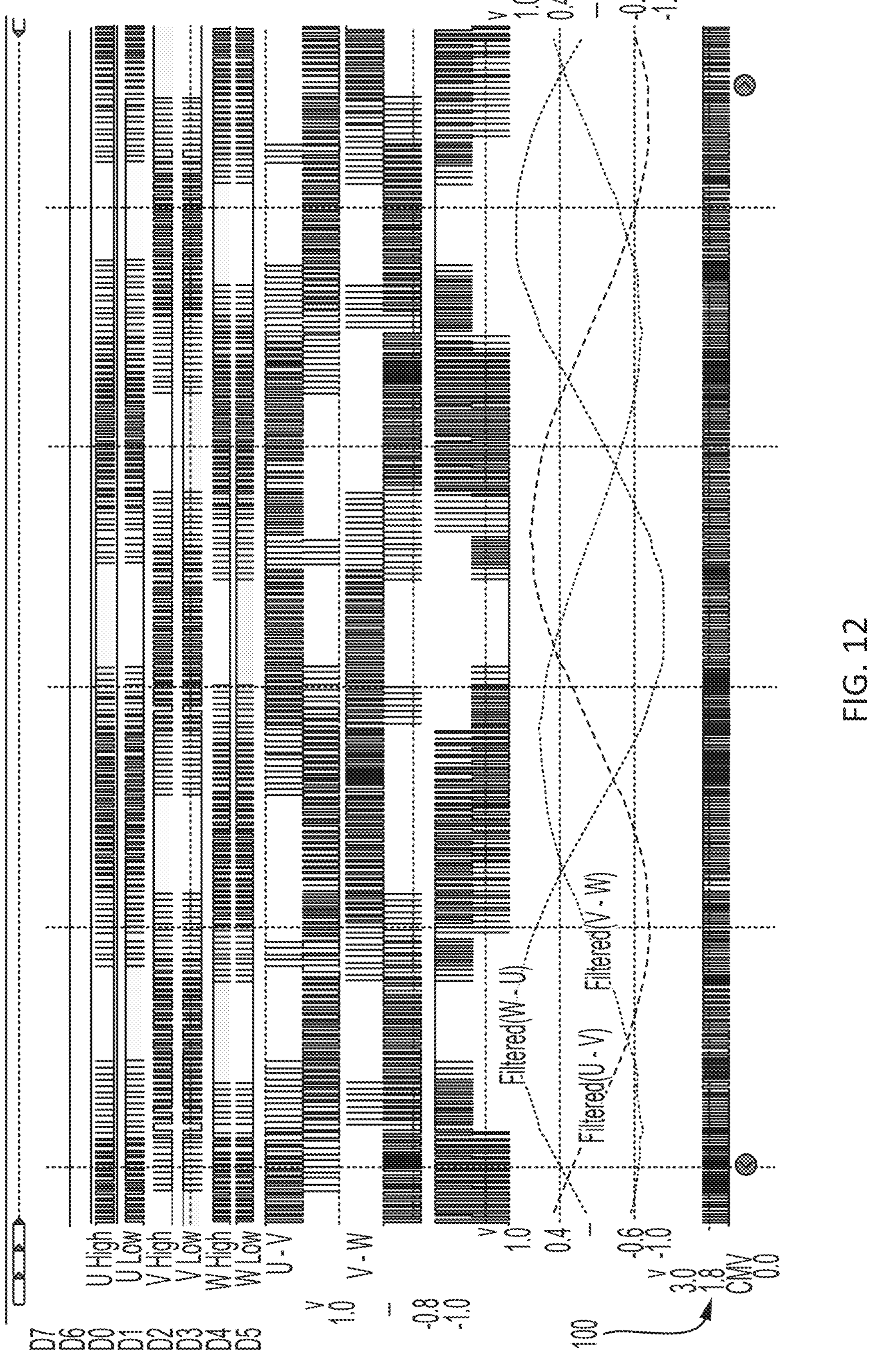
FIG. 12 is a graph depicting a sinusoidal PWM approach for controlling a single phase 3 wire motor according to the present disclosure and the associated common mode voltage.

Referring now to FIGS. 11 and 12, the effect of the above-described approach to reduction of $V_{cm}$ is shown graphically. In FIG. 11, the $V_{cm}$ associated with conventional SPWM is shown as waveform 100. As shown, $V_{cm}$ very frequently reaches $+V_{dc}/2$ or $-V_{dc}/2$. In FIG. 12, however, waveform 100 shows that the teachings of the present disclosure eliminate such large $V_{cm}$ occurrences.

As should be understood from the foregoing, the teachings of the present disclosure may be implemented solely in software. As such, the need for a large common mode choke (i.e., a passive electromagnetic device that permits the passage of the desired electrical signals while filtering out the unwanted high-frequency noise signals) is eliminated. This permits a substantial reduction in the size and cost of the hardware used to implement the motor drive 28.

Any directional references used with respect to any of the figures, such as right or left, up or down, or top or bottom, are intended for convenience of description, and do not limit the present disclosure or any of its components to any particular positional or spatial orientation. Additionally, any reference to rotation in a clockwise direction or a counter-clockwise direction is simply illustrative. Any such rotation may be implemented in the reverse direction as that described herein.

Although the foregoing text sets forth a detailed description of embodiments of the disclosure, it should be understood that the legal scope of the invention is defined by the words of the claims set forth at the end of this patent and equivalents. The detailed description is to be construed as exemplary only and does not describe every possible embodiment. Numerous alternative embodiments may be implemented, using either current technology or technology developed after the filing date of this patent, which would still fall within the scope of the claims.

The following additional considerations apply to the foregoing description. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at various times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. In certain embodiments, the methods are performed by a controller that executes non-transitory computer-readable instructions stored on a memory device. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single device or geographic location (e.g., within a home environment, an office environment, or a server farm). In other example embodiments, the one or more processors or processor-implemented modules may be distributed across a number of devices or geographic locations.

Unless specifically stated otherwise, use herein of words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Additionally, some embodiments may be described using the expression "communicatively coupled," which may mean (a) integrated into a single housing, (b) coupled using wires, or (c) coupled wirelessly (i.e., passing data/commands back and forth wirelessly) in various embodiments.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A method for reducing common mode voltage in a three-phase pulse width modulated ("PWM") system that includes a controller and an inverter connected to a single phase 3 wire motor by a cable, the method comprising:

controlling, by the controller, operation of a plurality of switches of the inverter to generate three voltage signals provided to the motor over the cable that emulate a three-phase sinusoidal waveform using a sinusoidal PWM ("SPWM") configuration;

phase shifting the three voltage signals by selecting a duty cycle overlap width;

identifying six sectors of the three-phase sinusoidal waveform based upon duty cycles of the three voltage signals;

identifying, for each of the six sectors, a Mid duty cycle and a Max duty cycle out of the three voltage signals;

determining, at a plurality of points for each of the six sectors, whether the identified Mid duty cycle is adjacent to the identified Max duty cycle; and increasing, for each of the plurality of points, any Mid duty cycle that is adjacent to a corresponding Max duty cycle by the duty cycle overlap width;

wherein controlling operation of the plurality of switches includes modifying the SPWM configuration to reduce instances where a first set of switches of the plurality of switches coupled to a positive voltage are simultaneously ON or simultaneously OFF, or where a second set of switches of the plurality of switches coupled to a negative voltage are simultaneously ON or simultaneously OFF.

2. The method of claim 1, wherein modifying the SPWM configuration includes using one of a High Low High configuration or a Low High Low configuration for each of the six sectors.

3. The method of claim 1, wherein, for each of the six sectors, the identified Mid duty cycle is adjacent to the identified Max duty cycle when an absolute value of a sum of the Mid duty cycle and the Max duty cycle is less than the selected duty cycle overlap width plus one.

4. The method of claim 1, wherein identifying the six sectors includes identifying points where one of the three voltage signals crosses another of the three voltage signals.

5. The method of claim 1, wherein, for each of the six sectors, the Mid duty cycle is located between two of the three voltage signals.

6. The method of claim 1, wherein the selected duty cycle overlap width is related to a fundamental speed of the motor.

7. The method of claim 1, wherein the selected duty cycle overlap width is based upon a dead band set for the SPWM configuration and a phase relationship among the three voltage signals.

8. The method of claim 1, wherein selecting the duty cycle overlap width includes setting an initial duty cycle overlap width equal to a dead band duration of the SPWM configuration, then adjusting the initial duty cycle overlap width to identify a final duty cycle overlap width that reduces the common mode voltage.

9. A system for reducing common mode voltage generated during operating of a single phase 3 wire motor, comprising:

a controller;

a memory device storing instructions;

an inverter controlled by the controller according to the instructions;

wherein execution of the instructions by the controller causes the controller to:

control operation of a plurality of switches of the inverter to generate three voltage signals provided to the motor that emulate a three-phase sinusoidal waveform using a sinusoidal PWM ("SPWM") configuration;

phase shift the three voltage signals using a duty cycle overlap width;

identify six sectors of the three-phase sinusoidal waveform based upon duty cycles of the three voltage signals;

identify, for each of the six sectors, a Mid duty cycle and a Max duty cycle out of the three voltage signals;

determine, at a plurality of points for each of the six sectors, whether the identified Mid duty cycle is adjacent to the identified Max duty cycle;

increase, for each of the plurality of points, any Mid duty cycle that is adjacent to a corresponding Max duty cycle by the duty cycle overlap width; and modify the SPWM configuration to reduce instances where a first set of switches of the plurality of switches coupled to a positive voltage are simultaneously ON or simultaneously OFF, or where a second set of switches of the plurality of switches coupled to a negative voltage are simultaneously ON or simultaneously OFF.

10. The system of claim 9, wherein the modified SPWM configuration includes using one of a High Low High configuration or a Low High Low configuration for each of the six sectors.

11. The system of claim 9, wherein, for each of the six sectors, the identified Mid duty cycle is adjacent to the identified Max duty cycle when an absolute value of a sum of the Mid duty cycle and the Max duty cycle is less than the duty cycle overlap width plus one.

12. The system of claim 9, wherein identifying the six sectors includes identifying points where one of the three voltage signals crosses another of the three voltage signals.

13. The system of claim 9, wherein, for each of the six sectors, the Mid duty cycle is located between two of the three voltage signals.

14. The system of claim 9, wherein the duty cycle overlap width is related to a fundamental speed of the motor.

15. The system of claim 9, wherein the duty cycle overlap width is based upon a dead band set for the SPWM configuration and a phase relationship among the three voltage signals.

16. The system of claim 9, wherein the duty cycle overlap width is determined by setting an initial duty cycle overlap width equal to a dead band duration of the SPWM configuration, then adjusting the initial duty cycle overlap width to identify a final duty cycle overlap width that reduces the common mode voltage.

17. A non-transitory computer-readable medium with an executable program stored thereon for reducing common mode voltages in a three-phase pulse width modulated ("PWM") system that includes an inverter connected to a single phase 3 wire motor, wherein the program instructs a controller to perform the following steps:

control operation of a plurality of switches of the inverter to generate three voltage signals provided to the motor that emulate a three-phase sinusoidal waveform using a sinusoidal PWM ("SPWM") configuration;

phase shift the three voltage signals using a duty cycle overlap width;

identify six sectors of the three-phase sinusoidal waveform based upon duty cycles of the three voltage signals;

identify, for each of the six sectors, a Mid duty cycle and a Max duty cycle out of the three voltage signals;

determine, at a plurality of points for each of the six sectors, whether the identified Mid duty cycle is adjacent to the identified Max duty cycle;

increase, for each of the plurality of points, any Mid duty cycle that is adjacent to a corresponding Max duty cycle by the duty cycle overlap width; and modify the SPWM configuration to reduce instances where a first set of switches of the plurality of switches coupled to a positive voltage are simultaneously ON or simultaneously OFF, or where a second set of switches of the plurality of switches coupled to a negative voltage are simultaneously ON or simultaneously OFF.

18. The non-transitory computer-readable medium of claim 17, wherein, for each of the six sectors, the identified Mid duty cycle is adjacent to the identified Max duty cycle when an absolute value of a sum of the Mid duty cycle and the Max duty cycle is less than the duty cycle overlap width plus one.

19. The non-transitory computer-readable medium of claim 17, wherein identifying the six sectors includes identifying points where one of the three voltage signals crosses another of the three voltage signals.

20. The non-transitory computer-readable medium of claim 17, wherein the duty cycle overlap width is related to a fundamental speed of the motor.

* * * * *